(12) United States Patent
Antonakakis

(10) Patent No.: US 10,027,681 B2
(45) Date of Patent: Jul. 17, 2018

(54) TRUSTED DEVICE CONTROL MESSAGES

(71) Applicant: NCR Corporation, Duluth, GA (US)

(72) Inventor: Stavros Antonakakis, Lake Mary, FL (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 15/427,515

(22) Filed: Feb. 8, 2017

(65) Prior Publication Data

US 2017/0149798 A1    May 25, 2017

Related U.S. Application Data

(63) Continuation of application No. 14/530,167, filed on Oct. 31, 2014, now Pat. No. 9,628,445.

(51) Int. Cl.
*H04L 9/32* (2006.01)
*H04L 29/06* (2006.01)

(52) U.S. Cl.
CPC ........ *H04L 63/123* (2013.01); *H04L 63/0853* (2013.01); *H04L 63/0876* (2013.01)

(58) Field of Classification Search
CPC ........ H04L 63/04; H04L 67/141; H04L 63/10
USPC .......................................................... 713/170
See application file for complete search history.

(56) References Cited

U.S. PATENT DOCUMENTS

| | | | |
|---|---|---|---|
| 7,065,556 B1 * | 6/2006 | Hickey | G06F 11/3476 709/202 |
| 2002/0059410 A1 * | 5/2002 | Hara | H04L 43/00 709/223 |
| 2003/0059001 A1 * | 3/2003 | Meyerson | H04L 51/36 379/88.13 |

* cited by examiner

*Primary Examiner* — Mohammad W Reza
(74) *Attorney, Agent, or Firm* — Schwegman, Lundberg & Woessner

(57) ABSTRACT

Two endpoint devices communicate with one another in a secure session using a secure protocol. Trusted control messages are passed upstream from one of the endpoint devices through one or more additional secure sessions to a centralized managing server. Additionally, trusted control messages are passed downstream from the centralized manager server through secure sessions to one or more of the endpoint devices. Each endpoint device is integrated into a terminal device.

7 Claims, 5 Drawing Sheets

TRUSTED DEVICE CONTROL MESSAGES

BACKGROUND

Online or electronic security is a major issue in the industry. It seems a month does not go by without news of some major business having a security breach. Such breaches include government agencies, retail outlets, social media companies, and even major banks.

Whenever an enterprise believes that a secure fix to remedy a breach has been deployed, hackers quickly figure out a new way to breach their systems. In some cases, the breaches are not even within the systems of the enterprise; rather, the breaches can occur over network transmission lines that enter or exit the enterprise systems; the hackers use sniffing techniques to acquire copies of data packets being transmitted over the network lines and find a way to break any encryption being used (assuming encryption was being used).

Even when an enterprise is capable of reasonably securing intra-device communications (communications between integrated devices within a composite device), large enterprises still face significant management issues of their entire fleet of devices.

For example, consider a retailer having multiple retail stores across the country. Each retail store includes multiple Point-Of-Sale (POS) terminals and each POS terminal includes multiple integrated devices, such as scanners, card readers, printers, etc. Even if the retailer is reasonably comfortable with secure communications within each POS terminal (e.g., scanner communication to a main processing unit of a POS terminal), the retailer may have difficulty in ensuring that it is obtaining adequate metrics and event messages at its backend centralized server for all of its POS terminals. This is so because any inter-device communication is exposed to the network and the network may have its own set of security issues, some of which may not even be entirely controlled by the retailer (network may be maintained by a third-party provider).

Therefore, there is a need for improving security associated with inter-device communications where those communications are exposed over one or more networks.

SUMMARY

In various embodiments, techniques for trusted device control messages are presented. According to an embodiment, a method for trusted control message communication is provided.

Specifically, an event is detected within a first device integrated into a terminal device. The event is defined as a trusted control message and the trusted control message is communicated from the first device to a second device when a secure session is established between the first device and the second device.

DETAILED DESCRIPTION

Figure 1A:
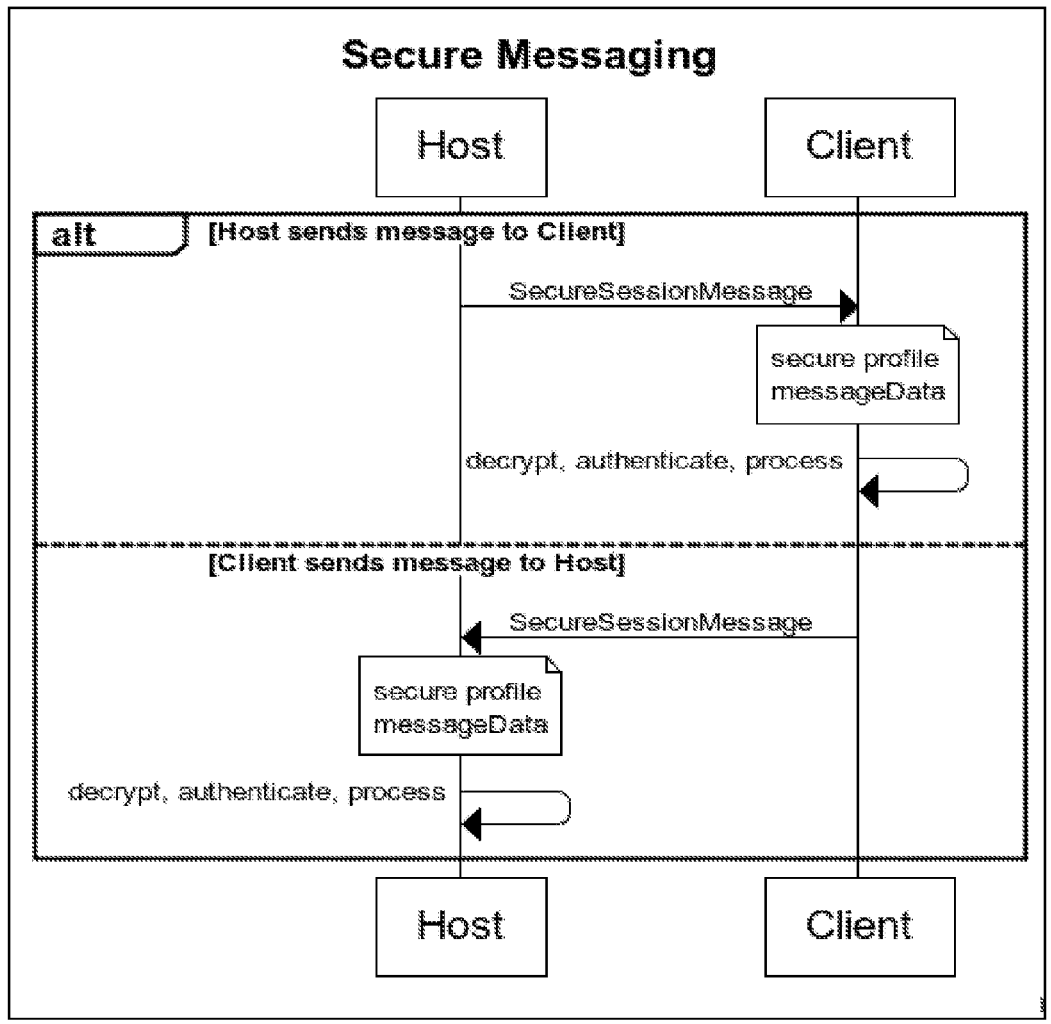
FIG. 1A is a diagram of interactions for trust control messaging between two devices, according to an example embodiment.

FIG. 1A is a diagram of interactions for trust control messaging between two devices, according to an example embodiment. The components of the diagram are shown in greatly simplified form with only those components shown necessary for the understanding of the some embodiments of the invention.

The inter-device communications discussed herein and below utilize a protocol for secure devices within a terminal to communicate with one another. The protocol utilizes custom encryption to encrypt data packets or data payloads during a secure communication session between the devices within the terminal.

In an embodiment, at least one device within the terminal is a Secure Input/Output Module (SIOM), which is a hardware module that is independent of the Operating System (OS) of the native terminal within which the SIOM resides. The SIOM serves as a secure interface for communications directed to and communications directed from one or more peripheral devices within the terminal.

In an embodiment, the peripheral devices can include, by way of example only, scanners, Magnetic Swipe/Card Readers, printers, pin pads, encrypted pin pads, value-media dispensers, displays, touch-screen displays, and the like.

In an embodiment, the terminal that includes the SIOM and peripheral devices is one of: a POS device, a Self-Service Terminal (SST), an Automated Teller Machine (ATM), and a kiosk.

An enterprise includes multiple networked terminals that communicate with a centralized server over one or more network connections. The network connections can be wired, wireless, or a combination of wired and wireless.

To efficiently centralize monitoring and management in a hierarchical deployment of a fleet of peripherals and terminals, the endpoint devices are enabled to securely communicate events and information upstream to the centralized server and conversely, commands from the centralized server downstream to the terminal having the endpoint devices.

As used herein, an "endpoint device" can include: a terminal device, a SIOM integrated into a terminal, or a peripheral device of a terminal.

The secure protocol that is used for managing and establishing secure sessions between endpoint devices is extended to support trusted control messages which flow over the secure sessions.

A "trusted control message" is a message that flows through one or more secure sessions down from the centralized server to an endpoint device or flows up through one or more secure sessions from an endpoint device to the centralized server. The content of the trusted control message can include event data, command data, or report data (metrics). The data of the trusted control message is "trusted" because it only flows over secure sessions meaning it is always in an encrypted format as it flows upstream or downstream. Moreover, the origination point of each trusted control message can be independently validated, such that the likelihood of a Man-In-The-Middle (MITM) attack can be mitigated and detected. So, nefarious commands send downstream to endpoint devices or erroneous reports sent upstream to the centralized server can be detected, ignored, and mitigation security actions taken if needed.

In situations where events or report data are collected but cannot be sent by an endpoint device because no secure session exists with another endpoint device, each of the endpoint devices house the events or report data in a secure cache resident on the endpoint device. The collected events or report data are sent once a secure session is eventually established with the endpoint device. For example, a SIOM can cache peripheral event tallies and report the tallies once the SIOM is capable of establishing a secure session with the centralized server over a network.

Although there may be messages/commands sent outside a secure session between the endpoint devices and the centralized server, such messages are not to be considered trusted control messages.

The format of the content within the trusted control message is in a normalized format recognized by the endpoint devices and the centralized server and defined within the secure protocol specification.

In an embodiment, the secure protocol specification is implemented using the Abstract Syntax Notation One (ASN.1) to define the syntax of the informational data that make up the Protocol Specification. In addition, the ASN.1 Basic Encoding Rules (BER) provide the rules for encoding of the specification and more specifically using on the ASN.1 Distinguished Encoding Rules (DER), a subset of BER, for the module definition. ASN.1 is a family of international standards jointly developed and published by ISO/IEC and the ITU-T. This is used for formally describing the logical structure of data (normalized nature of the trusted control messages) and exchange between two heterogeneous endpoints. The ASN.1 implementation also lends itself well to extensibility for future proofing the specification allowing for upgrade paths while encoding rules such as BER and DER remove the encoding incompatibility risks inherent in disparate systems that use different data alignment and computer architectures.

Referring now to the diagram FIG. 1A, FIG. 1A includes two devices, a host device (such as a SIOM) and a client device (such as a peripheral device) engaged in a secure communication session with one another (secure because data payload passing utilizes custom encryption and decryption known to just the host device and the client device and because the data payload passing occurs utilizing the secure protocol during the secure session).

Both the host device and the client device can be considered an endpoint device. With a secure session open (in progress), either endpoint can send messages to the other endpoint. Integrity, confidentiality, and authenticity, and other secure checks and balances are dependent on the secure protocol.

For example, in one implementation with a basic profile, a CTR-like block chaining is used with AES256, HMAC-SHA256 and a suite of separate encryption and authentication keys for reading and writing. The protocol also implements message counters for replay prevention and modified SHA-256 to protect against length extensions.

In an embodiment, the secure protocol uses message counters to ensure each trusted control message is uniquely identified and to detect duplicate presentations of a same trusted control message.

The secure protocol specification defines Protocol Data Units (PDUs) that describe various messages supported by the secure protocol. The trusted control message is a PDU that is similar to a secure session application message but differing only in the identifying number associated with the trusted control message. This ensures that different message types flow through the secure session via the secure protocol and can be subject to the same authentication and confidentiality algorithms associated with the secure protocol.

In an embodiment, the application message and trusted control message is defined in ASN.1, both message types are derived from a same message base. The sample definition for the two messages is as follows:

```
SecureSessionMessageBase ::= SEQUENCE
{
  profile      SECURESESSIONPROFILE.&profile
  ({SecureSessionProfiles}),
  messageData SECURESESSIONPROFILE.&MessageData
  ({SecureSessionProfiles}{@profile})
}
/*
    Secure Communication: I/O
    Once the secure session is available, all messages are transmitted
using the
    SecureSessionMessageBase
*/
SecureSessionApplicationMessage ::= [APPLICATION 8]
SecureSessionMessageBase
/*
    Trusted control messages are commands processed within
    the transport layer. They use the secure session message
    Input/Output (I/O) mechanism so the receiver can identify a
    message to be a trusted control message and intercept the
    plaintext prior to sending it to the application layer for
    processing.
    The plaintext of a SecureSessionControlMessage contains a
    ControlCommand object as defined below.
*/
SecureSessionControlMessage ::= [APPLICATION 9]
SecureSessionMessageBase
```

Once a trusted control message is received by an endpoint, the protocol handler is responsible for handling it and performing some action, ignoring it, passing it on, or a combination of some of the above. The user agent application that loads the endpoint may never be made aware of the reception of this trusted control message unless it is something that is desired and configured in the control message definition.

To illustrate with an example, below is a sequence diagram showing how the End Session trusted control message works. End Session is sent by either endpoint to begin termination of a secure session.

Figure 1B:
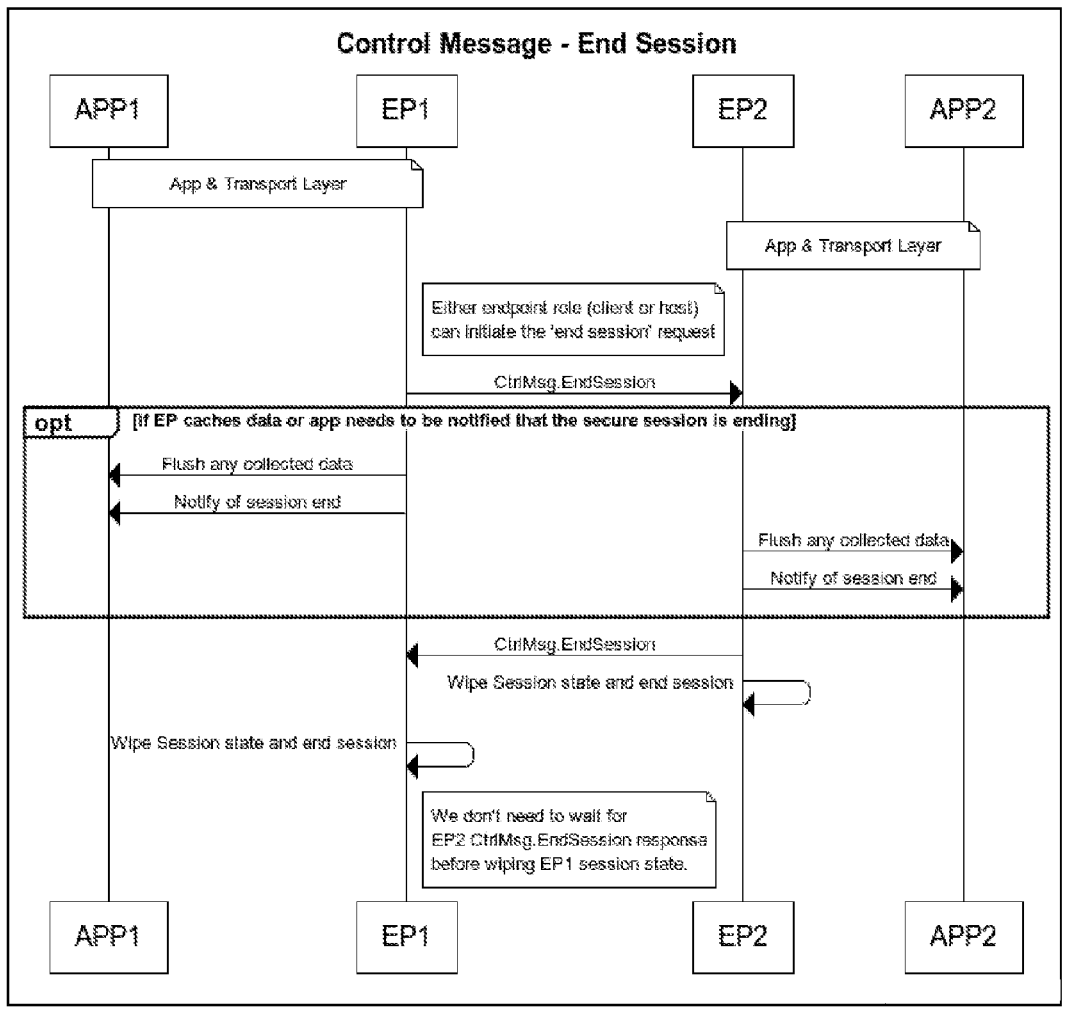
FIG. 1B is a diagram of interactions between devices and applications using trusted control messaging to end a secure session between the devices, according to an example embodiment.

FIG. 1B is a diagram of interactions between devices and applications using trusted control messaging to end a secure session between the devices, according to an example embodiment.

Again, either endpoint can initiate a trusted control message for ending a secure session. All trusted control messages are received and processed within the secure session to ensure integrity and authenticity. Both endpoints, optionally, flush their transport buffers and send any remaining already received data to the application layer as well as a notification that the session is ending. Each endpoint sends a "CntrlMsg.EndSession" prior to wiping their session state although it is not necessary for the initiating endpoint to wait for an acknowledgment from the other before shutting down. If data is received during the end session activity it will be discarded.

Trusted control messages can include protocol context activities, such as requesting the termination of a secure session, reporting ecosystem events, re-provisioning requests, etc. Every control message type as a distinct payload.

Some example, trusted control messages can include the following:

| Trusted Control Message | Sent by | Received by | Description |
|---|---|---|---|
| End Session | Client or Host | Client or Host | Request the termination of the current secure session. |
| Refresh Session | Client Or Host | Client of Host | Requests the current secure session are to be re-established by triggering the handshake process. |
| Provision SIOM | Client | Host | Client requests the host to trigger a re-provisioning with the enterprise system (centralized server). Note, all active secure sessions are invalidated after a new provisioning so care should be taken by the application layer to properly manage the notification and re-establishment of secure sessions. |
| Report Event | Client or Host | Client or Host | An informational packet containing details about a particular event occurrence. The type of event, the time of occurrence, an optional source and its severity are provided. An endpoint receiving a report event can be programmed to act on it (collect it, forward it) or ignore it. The specifics can be configured and left to the application layer. |
| . . . (and others can be configured and added) | | | |

In an embodiment, a report event trusted control message is implemented with the following ASN.1 definition. The ellipsis implies that the designated portion of the specification is extensible and any desired new report event types can be added without violating the secure session protocol specification.

```
ControlCommandReport ::= [APPLICATION 11] SEQUENCE {
    on              GeneralizedTime,
    source          UTF8String(SIZE(1..MAX)),
    event           ReportEventType,
    severity        ReportSeverityType
}
ReportEventType ::= [APPLICATION 12] ENUMERATED {
    -- common events
    noProfilesSupplied(0),
    wrongProfileSpecified(1),
    -- handshake events
    noCommonProfileFound(40),
    helloClientIdInvalid(41),
    helloAuthMissing(42),
    helloAuthInvalid(43),
    helloAuthFailed(44),
    announceClientIdInvalid(45),
    clientAnnounceDataInvalid(46),
    hostCreateDataInvalid(47),
    pKeyInvalid(48),
    eKeyInvalid(49),
    authFailure(50),
    permissionDenied(51),
    -- secure messaging events
    msgOutOfOrder(80),
    msgDecrypFailed(81),
    msgAuthFailed(82),
    msgEmpty(83),
    msgTooBig(84),
    -- control message events
    ctrlMsgUnknown(120),
    ctrlMsgInvalid(121),
    ctrlMsgReportInvalid(122),
    -- other events
    ... -- extensible
}
ReportSeverityType ::= [APPLICATION 13] ENUMERATED {
    debug(0),
    info(1),
    warning(2),
    error(3),
    fatal(4)
}
```

In a large enterprise system having tens of thousands of terminals globally distributed there is a large dispersed and distributed surface area and variety of devices and network connections that have the potential to be attacked for purposes of disrupting operations or stealing confidential data. Even when security is reasonably solved for each individual terminal, the problem of how to reasonably secure the entire network of devices remains problematic. The techniques presented herein for creation and implementation of trusted control messages within secure sessions using a secure protocol effectively puts a moat around the large disperse and distributed enterprise network and ensures that all important monitoring and management utilize the same novel technology (presented herein). Essentially, instead of the traditional layering approach for security of such distributed systems, the techniques herein build the security into the core of all communication through the trusted control messages communicated during a secure session using a secure protocol.

The above-discussed embodiments and other embodiments are now discussed with reference to the FIGS. 2-4.

Figure 2:
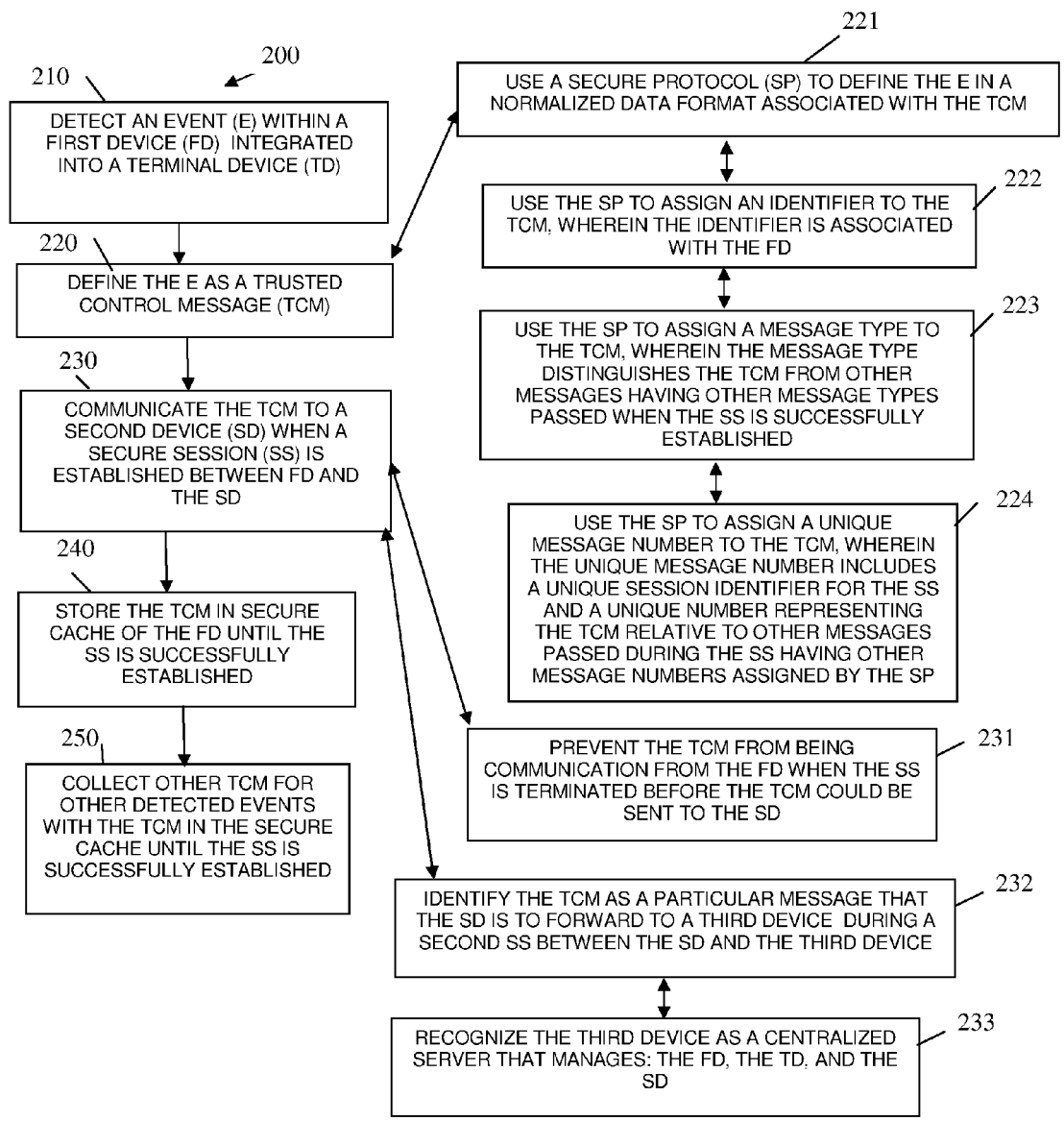
FIG. 2 is a diagram of a method for trusted control message communication, according to an example embodiment.

FIG. 2 is a diagram of a method 200 for trusted control message communication, according to an example embodiment. The method 200 (hereinafter "trusted control message manager") is implemented as instructions programmed and residing in memory or on a non-transitory computer-readable (processor-readable) storage medium and executed by one or more processors of a device. The processors are specifically configured and programmed to process the trusted control message manager. The trusted control message manager may also operate over one or more networks. The networks are wired, wireless, or a combination of wired and wireless.

In an embodiment, trusted control message manager is executed by a peripheral device as discussed above in the FIGS. 1A and 1B.

In an embodiment, the trusted control message manager is executed by a host device as discussed above in the FIGS. 1A and 1B.

In an embodiment, the trusted control message manager is executed by an endpoint device.

In an embodiment, the endpoint device is one of: a centralized managing server of distributed network terminals, a terminal device, a SIOM, and a peripheral device.

In an embodiment, the terminal device is one of: a POS device, a SST, a kiosk, and an ATM.

In an embodiment, the peripheral device is one of: a scanner, a printer, a pin pad, an encrypted pin pad, a keyboard, a Magnetic Strip/Card Reader (MSR), a display, a touch-screen display, and a value-media dispenser.

At 210, the trusted control message manager detects an event within a first device integrated into a terminal device.

The event can be associated with a variety of data, such as but not limited to: metric data (tallies for operations, specific operations processed, success or failures of operations, identifiers for agents requesting operations, dates and times for operations processed, and the like), threat data (secure access requests, resource installation or deactivation, monitoring activities, storage exceptions, invalid operation requests, and the like), state data triggered periodically by configuration or driven by secure requests, and others.

In an embodiment, the first device is any device within an enterprise system having a network of terminal devices geographically dispersed.

At 220, the trusted control message manager defines the event as a trusted control message. By trusted it is meant that the message is custom encrypted using a pre-defined agreed upon encryption algorithm, encryption keys, and key sizes; the message only communicated from the first device during a secure communication session with another device using a secure protocol (as discussed above with the descriptions of the FIGS. 1A and 1B).

According to an embodiment, at 221, the trusted control message manager uses a secure protocol to define the event in a normalized data format associated with the trusted control message. By normalized it is meant that the data format for the trusted control message is recognizable by an intended recipient of the trusted control message, which may or may not be a next device to which the trusted control message is communicated. That is, in some situations, any intermediary device that receives the trusted control message from the first device will be unable to decrypt the data payload or any content of the trusted control message.

In an embodiment of 221 and at 222, the trusted control message manager uses the secure protocol to assign an identifier to the trusted control message. The identifier is associated with the first device. So, the unique identity associated with the originating device of the trusted control message (which is the first device) is carried either in the data payload associated with the trusted control message or as metadata associated with the trusted control message.

In an embodiment of 222 and at 223, the trusted control message manager uses the secure protocol to assign a message type to the trusted control message. The message type distinguishes the trusted control message from other messages having other message types, which may be passed when a secure session is established between the first device and a second device.

In an embodiment of 223 and at 224, the trusted control message manager uses the secure protocol to assign a unique message number to the trusted control message. The unique message number includes a unique session identifier for the secure session during which the trusted control message is communicated and the unique message number includes a unique number for the secure session to distinguish the trusted control message relative to other messages passed during the secure session.

At 230, the trusted control message manager communicates the trusted control message to a second device when a secure session is established between the first device and the second device. Again, the trusted control message is only passed during a secure session.

According to an embodiment, at 231, the trusted control message manager actively prevents the trusted control message from being communicated from the first device when the secure session is terminated before the trusted control message can be or could be sent to the second device. This may be achieved through the management of the secure protocol.

In an embodiment, at 232, the trusted control message manager identifies the trusted control message as a particular message that the second device is to forward (upstream or downstream within a network) to a third device during a second secure session between the second device and the third device. In this case, the second device may or may not be able to decrypt all, some, or none of the data payload associated with the trusted control message.

In an embodiment of 232 and at 233, the trusted control message manager recognizes (perhaps via the secure protocol) the third device (endpoint recipient device) as a centralized server that manages: the first device, the terminal device, and the second device.

According to an embodiment, at 240, the trusted control message manager stores the trusted control message in secure cache (accessible to just the first device and encrypted) of the first device until the secure session is successfully established.

In an embodiment, at 241, the trusted control message manager collects other trusted control messages for other detected events with the trusted control message in the secure cache until the secure session is successfully established.

Figure 3:
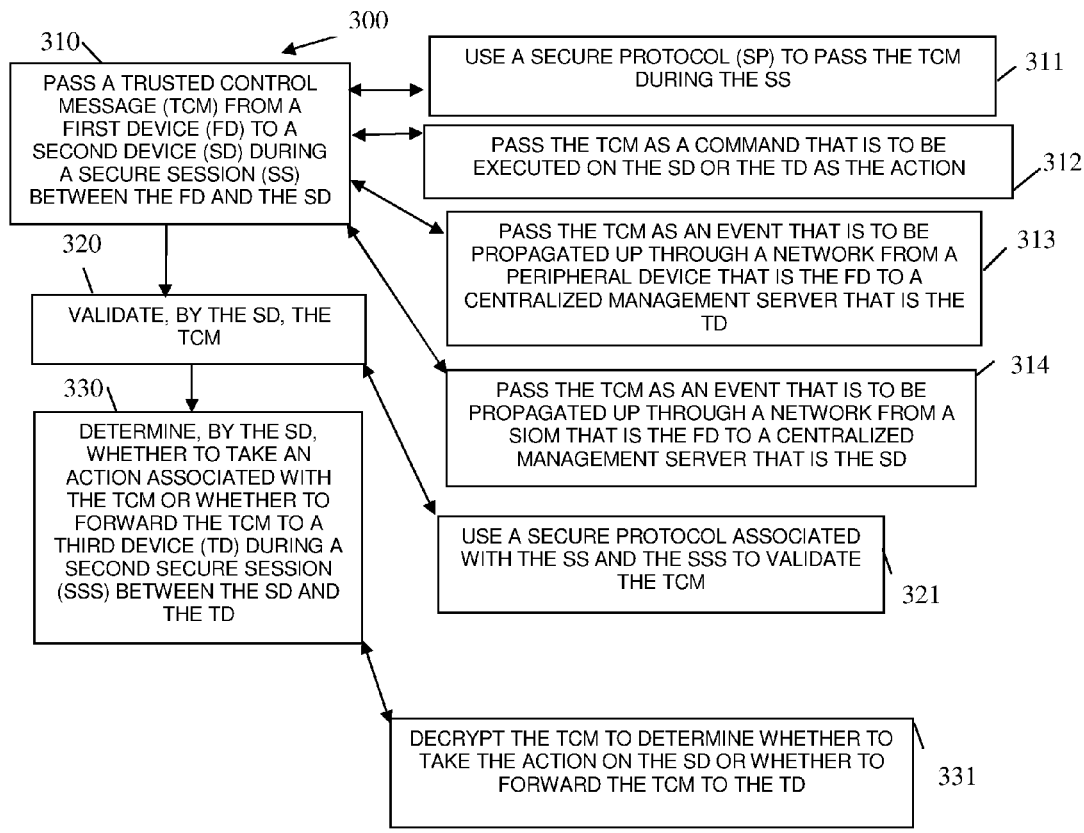
FIG. 3 is a diagram of another method for trusted control message communication, according to an example embodiment.

FIG. 3 is a diagram of another method 300 for trusted control message communication, according to an example embodiment. The method 300 (hereinafter "trusted message controller") is implemented as instructions and programmed within memory or a non-transitory computer-readable (processor-readable) storage medium that executes on one or more processors of a device; the processors of the device are specifically configured to execute the trusted message controller. The trusted message controller is also operational over one or more networks; the networks may be wired, wireless, or a combination of wired and wireless.

The trusted message controller another and perhaps enhanced perspective of the trusted control message manager presented above with respect to the FIG. 2.

In an embodiment, the trusted message controller is executed by a peripheral device as discussed above in the FIGS. 1A and 1B.

In an embodiment, the trusted message controller is executed by a host device as discussed above in the FIGS. 1A and 1B.

In an embodiment, the trusted message controller is executed by an endpoint device.

In an embodiment, the endpoint device is one of: a centralized managing server of distributed network terminals, a terminal device, a SIOM, and a peripheral device.

In an embodiment, the terminal device is one of: a POS device, a SST, a kiosk, and an ATM.

In an embodiment, the peripheral device is one of: a scanner, a printer, a pin pad, an encrypted pin pad, a keyboard, a Magnetic Strip/Card Reader (MSR), a display, a touch-screen display, and a value-media dispenser.

At 310, the trusted message controller passes a trusted control message from a first device to a second device during a secure session between the first device and the second device.

According to an embodiment, at 311, the trusted message controller uses a secure protocol to pass the trusted control message during the secure session. This was described above with reference to the FIGS. 1A and 1B.

In an embodiment, at 312, the trusted message controller passes the trusted control message as a command that is to be executed on the second device or the third device as the action.

In an embodiment, at 313, the trusted message controller passes the trusted control message as an event that is to be propagated up through a network from a peripheral device that is the first device to a centralized management server, which is the third device.

In an embodiment, at 314, the trusted message controller passes the trusted control message as an event that is to be propagated up through a network from a SIOM, which is the first device, to a centralized management server, which is the second device.

At 320, the trusted message controller validates, by the second device, the trusted control message.

According to an embodiment, at 321, the trusted message controller uses a secure protocol associated with the first secure session and the second secure session (discussed below at 330) to validate the trusted control message.

At 330, the trusted message controller determines, by the second device, whether to take an action associated with the trusted control message or whether to forward the trusted control message to a third device during a second secure session between the second device and the third device.

Figure 4:
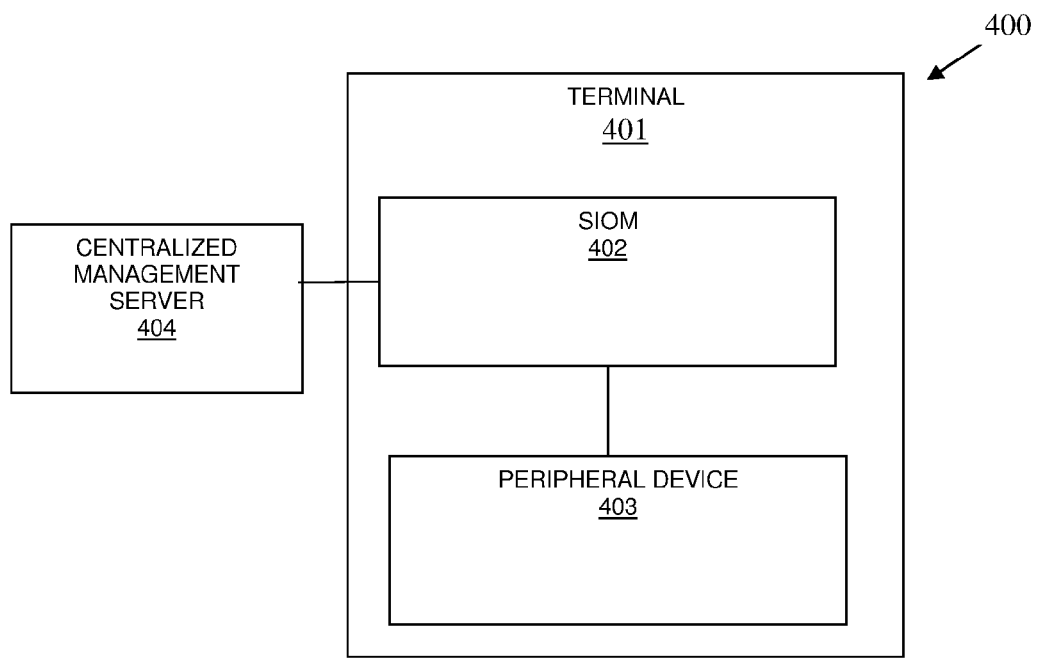
FIG. 4 is a diagram of a trusted control messaging system, according to an example embodiment.

FIG. 4 is a diagram of a trusted control messaging system 400, according to an example embodiment. Some components of the trusted control messaging system 400 are implemented as executable instructions and programmed within a non-transitory computer-readable (processor-readable) storage medium that execute on one or more processors of a device; the processors are specifically configured to execute the components of the trusted control messaging system 400. The trusted control messaging system 400 is also operational over one or more networks; any such networks may be wired, wireless, or a combination of wired and wireless.

In an embodiment, the trusted control messaging system 400 implements, inter alia, the processing depicted in the FIGS. 1A and 1B.

In an embodiment, the trusted control messaging system 400 implements, inter alia, the method 200 of the FIG. 2.

In an embodiment, the trusted control messaging system 400 implements, inter alia, the method 300 of the FIG. 3.

The trusted control messaging system 400 includes a terminal device 401 and a SIOM 402. In an embodiment, trusted control messaging system 400 includes a peripheral device 403. In an embodiment, the trusted control messaging system 400 includes a centralized management server 404.

In an embodiment, the terminal 401 is one of: a POS device, an ATM, a SST, and a kiosk.

The SIOM 402 is integrated into the terminal device 401 as an independent module, which is independent of the OS platform of the terminal device 401. The SIOM 402 is configured and adapted to: establish a first secure session with the centralized management server 404, establish a second secure session with the peripheral device 403, and determine whether to: take an action on the SIOM defined by the trusted control message and received by the SIOM 402 during the first secure session or the second secure session.

According to an embodiment, the trusted control messaging system 400 includes the peripheral device 403. The peripheral device 403 is integrated into the terminal device 401. The peripheral device 403 is adapted and configured to one or more of: pass the trusted control message to the SIOM 402 during the second secure session and receive the trusted control message from the SIOM 402 during the second secure session.

In an embodiment, the trusted control messaging system 400 includes the centralized management server 404. The centralized management server 404 is externally located over a network from the terminal device 401. In an embodiment, the network is a Local Area Network (LAN). In an embodiment, the network is a Wide-Area Network (WAN).

The centralized management server 404 is configured and adapted to: pass the trusted control message to the SIOM 402 during the first secure session and receive the trusted control message from the SIM 402 during the first secure session.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system comprising: a terminal device;
a Secure Input/Output Module (SIOM) integrated into the terminal device and configured and adapted to: i) establish a first secure session with a centralized management server, ii) establish a second secure session with a peripheral device, and
iii) determine whether to: a) pass a trusted control message in a format recognized by the SIOM, the centralized management server, and the peripheral device, and
containing event information for reporting an event including a type associated with the event and a severity of the event, to one of: the centralized management server during the first secure session and the peripheral device during the second secure session and b) forwarding the event information during one of: the first secure session and the second secure session, wherein the SIOM is an independent hardware module of the terminal device and the SIOM is independent of an Operating System (OS) of the terminal device, and wherein the SIOM is configured to provide security through the trusted control message processing during the first secure session and the second secure session.

2. The system of claim 1, wherein the SIOM is also configured to pass another trusted control message in the format for ending a corresponding secure session.

3. The system of claim 1, wherein the SIOM is also configured to pass another trusted control message in the format for refreshing a corresponding secure session.

4. The system of claim 1, wherein the SIOM is also configured to pass another trusted control message in the format for provisioning the SIOM.

5. The system of claim 1 further comprising: the peripheral device integrated into the terminal device and configured and adapted to one or more of: i) pass the trusted control message to the SIOM during the second secure session and ii) receive the trusted control message from the SIOM during the second secure session.

6. The system of claim 1 further comprising: the centralized management server configured and adapted to one or more of: i) pass the trusted control message to the SIOM during the first secure session and ii) receive the trusted control message from the SIOM during the first secure session.

7. A system comprising: a terminal device;
a peripheral device coupled to the terminal device; and
a Secure Input/Output Module (SIOM) integrated into the terminal device and configured and adapted to: i) establish a first secure session with the peripheral device, ii) receive a first trusted control message reporting an event from the peripheral device during the first secure session, iii) cache peripheral event tallies, iv) establish a second secure session with a centralized management server, and v) and send a second trusted control message reporting the peripheral event tallies to the centralized management server during the second secure session, wherein the SIOM is an independent hardware module of the terminal device and the SIOM is independent of an Operating System (OS) of the terminal device, and wherein the SIOM configured to provide security through the first trusted control message and the second trusted control message processing during the first secure session and the second secure session.

* * * * *